US007668862B2

(12) United States Patent
Hoennig

(10) Patent No.: US 7,668,862 B2
(45) Date of Patent: Feb. 23, 2010

(54) SYSTEM AND METHOD FOR CONTROLLING THE USE OF A METHOD IN AN OBJECT-ORIENTED COMPUTING ENVIRONMENT

(75) Inventor: Michael Hoennig, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 414 days.

(21) Appl. No.: 11/049,517

(22) Filed: Feb. 2, 2005

(65) Prior Publication Data

US 2005/0234956 A1 Oct. 20, 2005

(30) Foreign Application Priority Data

Apr. 19, 2004 (EP) .................................. 04252294

(51) Int. Cl.
*G06F 17/00* (2006.01)
(52) U.S. Cl. ..................................... 707/103 R; 726/26
(58) Field of Classification Search ........................ None
See application file for complete search history.

(56) References Cited

U.S. PATENT DOCUMENTS

| 5,852,666 | A  | * | 12/1998 | Miller et al. ................. 713/167 |
| 6,279,111 | B1 | * | 8/2001  | Jensenworth et al. .......... 726/10 |
| 6,351,817 | B1 | * | 2/2002  | Flyntz ........................... 726/4 |
| 6,412,070 | B1 | * | 6/2002  | Van Dyke et al. ............. 707/10 |
| 6,625,603 | B1 | * | 9/2003  | Garg et al. ...................... 707/9 |
| 2002/0138727 | A1 | * | 9/2002 | Dutta et al. .................. 713/167 |
| 2003/0097582 | A1 | * | 5/2003 | Audebert et al. ............. 713/200 |
| 2003/0115487 | A1 | * | 6/2003 | Andrews et al. ............. 713/201 |

FOREIGN PATENT DOCUMENTS

GB    2 308 688    7/1997

OTHER PUBLICATIONS

Masashi, et al., "Role-Based Purpose-Oriented Access Control for Distributed Systems," 'Online!, 1998, XP002296045, 3 pages.

(Continued)

*Primary Examiner*—Don Wong
*Assistant Examiner*—Belinda Xue
(74) *Attorney, Agent, or Firm*—Robert C. Kowert; Meyertons, Hood, Kivlin, Kowert & Goetzel, P.C.

(57) ABSTRACT

A system and method for controlling the use by caller objects to a restricted method of a resource object in an object-oriented computing environment are provided in accordance with one embodiment of the invention. The method is based on associating an access-token with a caller object which is to be allowed to access the restricted method and sharing this access-token with the resource object. When subsequent calls to the restricted method are made by a caller object, access is made contingent on the caller object providing the access-token as part of the call procedure. Where no access-token is provided, or an invalid access-token is provided, access to the method is denied or restricted. The method provides protection against innocently made wrong calls to a restricted method by a caller object, for example due to coding errors. The method also provides protection against maliciously made calls to a restricted method by caller objects that should not have access to it.

38 Claims, 4 Drawing Sheets

OTHER PUBLICATIONS

Object Management Group, "Security Service Specification," XP002296433, Version 1.8, Mar. 2002, Chapters 1, 2, 3.

Partha Dasgupta, et al., "Efficient and Secure Information Sharing in Distributed, Collaborative Environments," XP002296434, Third International Workshop on Communication-Based Systems, Mar. 2000, 8 pages.

Keiji Izaki, et al., "Access Control Model in Object-Oriented Systems," IEEE, 2000, Jul. 4, 2000, pp. 69-74.

European Search and Examination Report for Application No. 04252294.6-1243-, Oct. 1, 2004, 9 pages.

John Hale, et al., "A Ticket-Based Access Control Architecture for Object Systems," IOS Press, 2000, 21 pages.

Communication Pursuant to Article 96(2) EPC, from foreign associate, dated Jul. 18, 2007.

Partha Dasgupta, et al., "Efficient and Secure Information Sharing in Distributed, Collaborative Environments," Dept. of Computer Science and Engineering, Arizona State University, 2000.

* cited by examiner

SYSTEM AND METHOD FOR CONTROLLING THE USE OF A METHOD IN AN OBJECT-ORIENTED COMPUTING ENVIRONMENT

FIELD OF THE INVENTION

This invention relates to controlling the use of a method such as in an object-oriented computer environment.

BACKGROUND OF THE INVENTION

In computing it is common for a user to have to enter a password in order to access a particular resource. This can be regarded as operating at the application or architectural level, since it is generally used to restrict access to various application functionality, such as the ability to manipulate a bank account.

It can also be desired to control access at much lower level, in relation to particular code. For example, in an object-oriented computing environment, one object may call a method belonging to another object. The object making the call is sometimes referred to as a caller object and the object which receives the call is sometimes referred to as a resource object. The Java programming language (Java is a trademark of Sun Microsystems Inc.) provides a mechanism to restrict access to object methods. In particular, methods of a class may be specified as having different access rights by being declared as public, private or protected methods. A method declared as public may be accessed by all objects. A method declared as private may be accessed only by other members of its class. A method declared as protected may be accessed by other members of its package, and also by members of its subclasses inside or outside the package. Further details can be found in standard books on Java, such as "Learning Java" by Niemeyer and Knudsen, O'Reilly, 1997, ISBN 1-56592-718-4.

One particular situation in which it is desired to restrict access to certain objects relates to the StarOffice Uniform Network Objects (UNO) programming environment (StarOffice is a trademark of Sun Microsystems Inc.). In UNO, the method com.sun.star.lang.XComponent.dispose( ) should only be called by the owner of the resource object to which the interface containing this method belongs. The owner object here is typically the object that first creates the resource object. The above method may be called by an object's owner to explicitly free resources kept by the object, for example, to break cyclic references. Thus the call causes the resource object to release its resources and references.

Problems may arise if this method is called by an object other than the owner object. This is most likely to occur in respect of code from third parties such as independent software vendors (ISVs), system integrators, and so on. Calling the dispose( ) method at an inappropriate juncture or in an inappropriate manner can often lead to a system crash. In many cases this problem arises without malicious intent, simply as a consequence of poor design or coding errors. However, it is also possible to make this type of call on purpose in a deliberate attempt to crash the system. This then has significant security implications for the system.

Unfortunately, the provision of private and protected methods in Java does little to alleviate this difficulty, since such access restrictions apply at the class level. In contrast, the above problems normally arise in respect of certain objects (i.e. particular instances of the class).

SUMMARY OF THE INVENTION

Accordingly, one embodiment of the invention provides a method for controlling the use of a method in an object-oriented computing environment. The method involves a first object creating a second object, and sharing an access-token with the second object. The second object then receives a method call accompanied by a caller access-token. The second object authenticates the caller access-token against the access-token shared with the first object.

Method calls which are not accompanied by the relevant access-token fail authentication, and so are not executed or are subject to some other form of restriction. This protects against unauthorised calls, whether due to coding errors or to deliberate attempts to access an unauthorised object. The control is achieved at an application programming interface (API) level, and can be applied to function calls, interfaces, and so on.

Another embodiment of the invention provides a method for controlling the use of a method in an object-oriented computing environment. The method includes sharing an access-token between a first object and a second object, where the second object retains the access-token, and the second object receives a call to a method of the second object accompanied by a caller access-token. The second object authenticates the caller access-token against the shared access-token in order to control use of the method.

BRIEF DESCRIPTION OF THE DRAWINGS

Embodiments of the present invention will be described hereinafter, by way of example only, with reference to the accompanying drawings in which like reference signs relate to like elements and in which.

DETAILED DESCRIPTION

Figure 1:
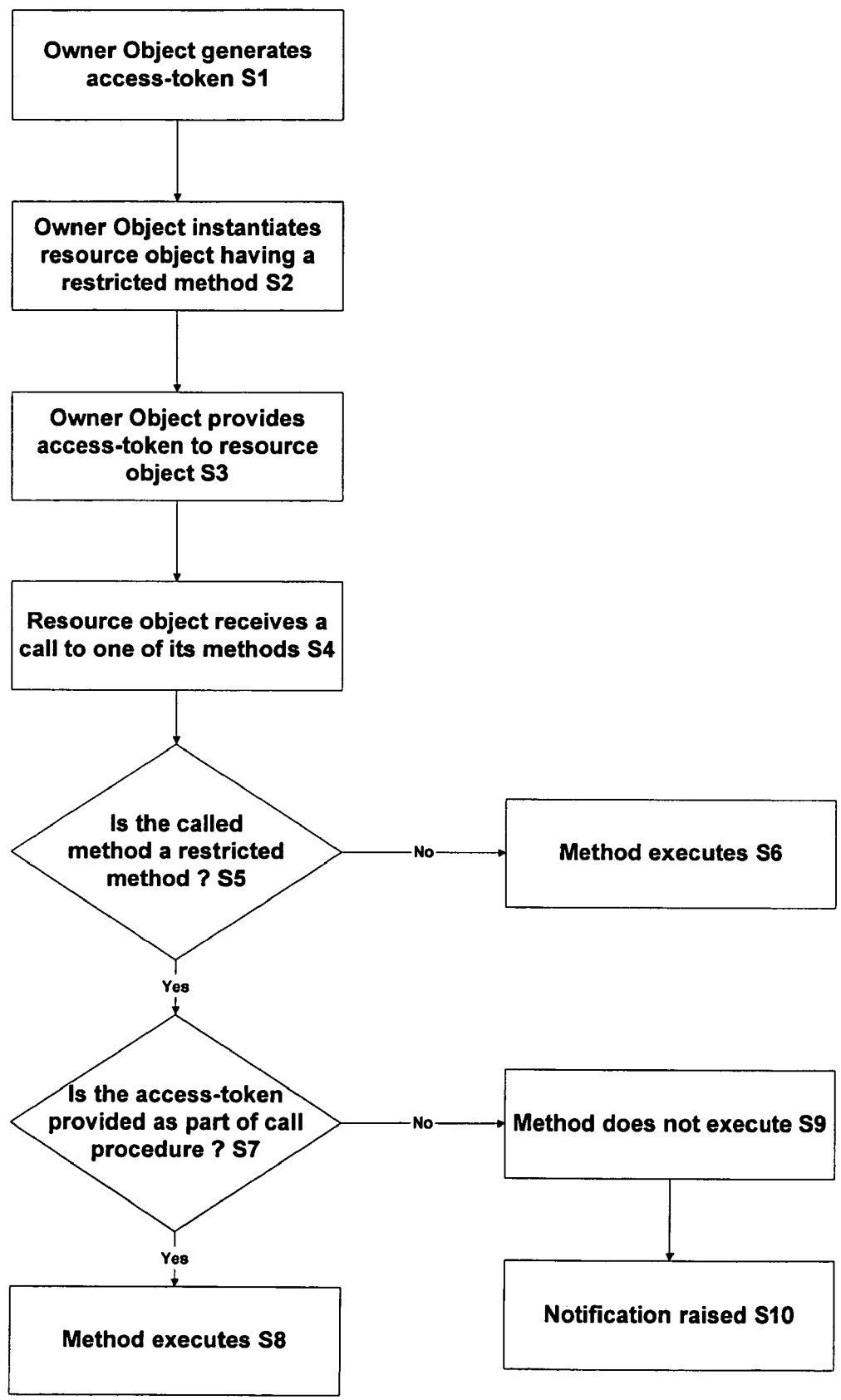
FIG. 1 is a flow diagram schematically showing a scheme for controlling access to a restricted method of an object according to a first embodiment of the invention.

FIG. 1 is a flow diagram schematically showing a scheme for controlling access to a restricted method of a resource object running in an object-oriented programming environment according to one embodiment of the invention. The scheme shown in FIG. 1 allows only the owner of the resource object to access its restricted methods, that is to say only the owner of the resource object is an authorised object.

In this example, the owner object is also the object which instantiates the resource object, i.e. the owner object is also the creator object. It will be appreciated that the owner object may itself be owned by, and called by, one or more other objects, i.e. the owner object may itself be a resource object for another caller object, and may have its own restricted methods. Similarly, the resource object may itself be the owner of, and may make calls to, other objects in an application.

In S1, an owner object desires to instantiate a resource object having one or more restricted methods. Accordingly, the owner object generates an access-token, which may be a randomly generated alpha-numeric string. The owner object privately stores the access-token. In S2, the owner object instantiates (i.e. creates) the resource object. In S3 the owner object passes the access-token to the newly instantiated resource object. Note that in some embodiments, the access-token is passed to the resource object as part of the instantiation procedure of S2. The resource object then privately stores the access-token that it has received from the owner object. This stored access-token will be referred to hereafter as the authentic access-token, since other access-tokens can be authenticated against it.

Methods of the resource object are now available for calling. Access to at least one of the method of the resource object is restricted. Calling a restricted method requires the access-token to be passed as an argument to the call.

In S4, the resource object receives a call to one of its methods from one of the objects in the application. In S5, the resource object determines whether the call is to one of its restricted methods. If the call is not to one of its restricted methods, the flow diagram follows the "NO" branch to S6, whereupon the called method executes normally. If however the call is to one of the resource object's restricted methods, the flow diagram follows the "YES" branch to S7. In S7, the resource object determines whether the object making the call, i.e. the caller object, has provided a valid (authentic) access-token as an argument to the method call. In other words, does any access-token received from the caller object match the authentic access-token stored by the resource object. The resource object makes such a determination by comparing the access-token received as an argument with its stored authentic access token.

If the caller object has indeed provided a valid access-token, the flow diagram follows the "YES" branch to S8, in which the restricted method executes normally. If, on the other hand, the caller object did not provide a valid access-token, either because the caller object provided an access-token that did not match the one privately stored by the resource object, or because the caller object did not provide any access-token at all, the flow diagram follows the "NO" branch to S9. In S9, the restricted method fails to execute, and in S10 a notification is provided to the caller object that it has been denied access to the restricted method.

In one embodiment, the notification at S10 is a security exception. This allows an application to monitor, and possibly alert a user to, any failed attempt to access a restricted method. Other embodiments may use different error notification mechanisms; indeed, in some embodiments, the resource object may not provide any notification that access has been refused to a restricted method (i.e. S10 of FIG. 1 may be omitted).

An application may simply ignore any notification raised at S10. In this way, the normal operation of the application is not affected by unauthorised calls to restricted methods, but such calls may nonetheless be prevented from executing. Where a notification is raised, this can be used to assist in de-bugging, if coding errors are responsible for the occurrence of unauthorised method calls. A notification can also be used to help identify and assess the security risk posed by any rogue caller objects that might be maliciously attempting to access restricted methods.

The following example shows a restricted method and an example call to the restricted method in pseudo-Java code.

Example Implementation of a Restricted Method:

```
void RestrictedMethod(long nArg, AccessToken aAccessToken)
    throws SecurityException
{   if(this.aAccessToken( ) != aAccessToken)
        throw SecurityException("not owner call");
    ...
}
```

Example Call to the Restricted Method:

```
try
{
    iRestrictedObj.RestrictedMethod(argument,AccessToken)
    ;
}
catch(SecurityException)
{
    ...
}
```

In the above, "Restrictedobj" is an object having a restricted method "RestrictedMethod". The restricted method takes "nArg" parameters to perform its normal function, and additionally takes a parameter "AccessToken" to implement the authentication scheme. "aAccessToken" is the access-token provided by the caller object. If the access-token as part of the method call does not match that stored within the method, a "not owner call" security exception is raised.

An analogous scheme can be used to control interface queries. For example, an interface could be returned to a caller object only if the caller object provides a valid access-token as part of its call to the interface. The following schematically shows an example implementation of a query to a restricted interface in pseudo-Java code.

Example Query to a Restricted Interface:

```
try
{
    PrivateInterface iPrivateInterface =
        iRestrictedObj.queryInterface
        (privateInterface.Type, aAccessToken);
}
catch(SecurityException)
{
    ...
}
```

In the scheme shown in FIG. 1, the access-token is generated in S1 as and when required, i.e. when a new resource object is to be instantiated. In other embodiments, especially if protection against malicious attempts to make unauthorised calls to a restricted method is not a major concern, each object in the application could be associated with a single static access-token. This single static access-token could then be used for all calls to restricted methods.

For example, rather than generate an access-token at S1 of FIG. 1, an owner object could instead retrieve an access-token which it already has stored. This pre-stored access-token might be written into the source code of the owner object, or it might perhaps be attributed to it during run-time.

An authorised object, for example one which owns the resource object in the scheme shown in FIG. 1, may confer the right to access restricted methods of the resource object on another object. For example, the authorised object may provide details of the access-token to a further object such that it can become a second authorised object. The second object then privately stores the access-token and may use it when making calls to the restricted method in the same way as the initial authorised object.

In some embodiments, a restricted method of the resource object may allow an authorised object to change the access-token to a new access-token. For example, an object may support a method that has as its argument the new access-token to be used. In general, the method should itself be restricted, so that in order to change the access-token, a caller object has to provide both the old (current) access-token and also the new (future) access-token. Of course, if the old access-token that is provided is incorrect, then the access token for the resource object remains unchanged. The ability to change the access-token is useful where an object which should no longer be allowed to access the restricted method(s) of the resource object is aware of the current access-token.

Figure 2:
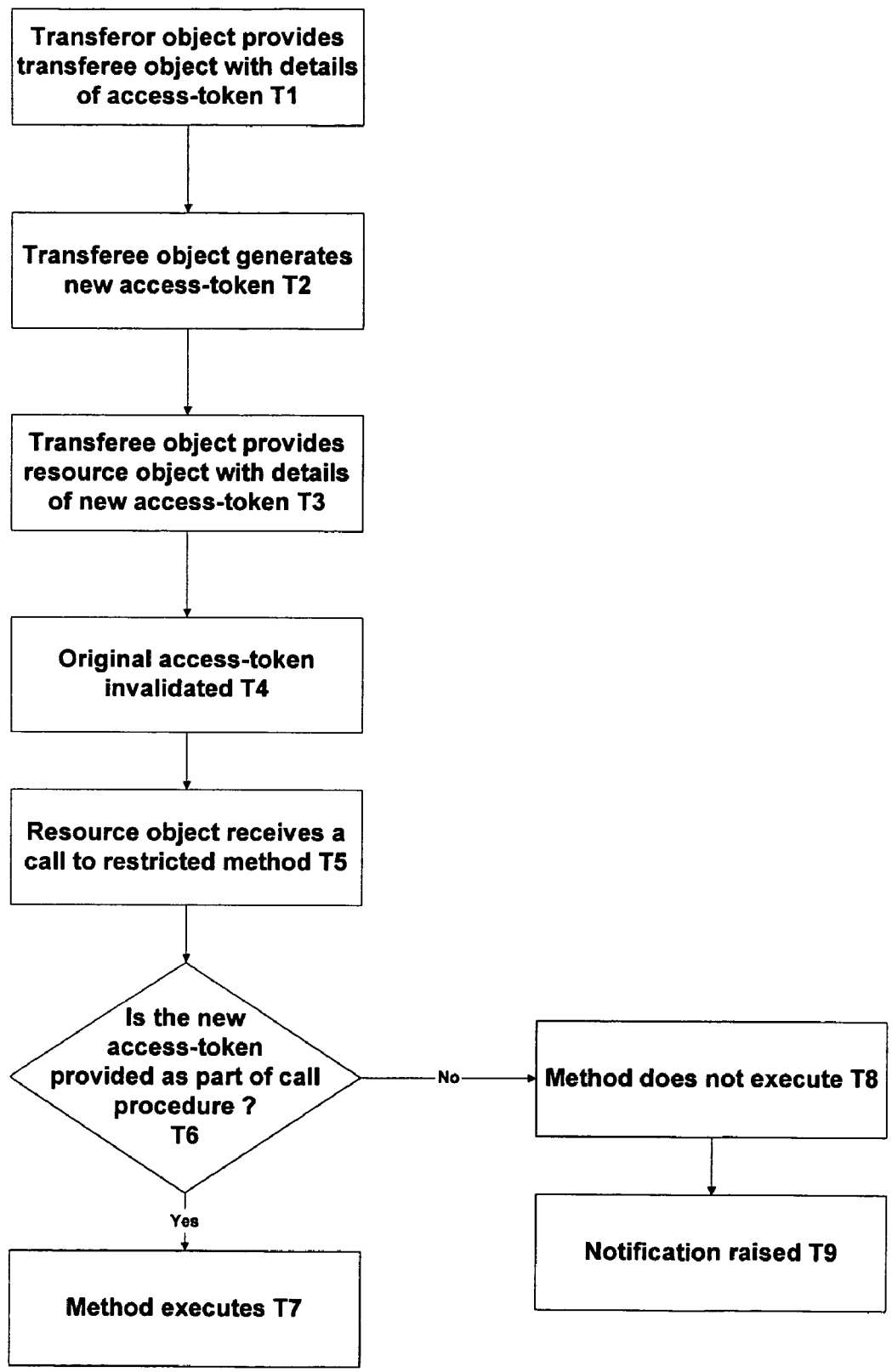
FIG. 2 is a flow diagram schematically showing a scheme for transferring the right to access a restricted method of an object from an object having that right to a further object in accordance with one embodiment of the invention.

FIG. 2 is a flow diagram schematically showing a scheme for transferring the right to access one or more restricted methods of a resource object from an object having that right, i.e. an authorised object such as the owner object of FIG. 1, to a further, initially unauthorised, object. These objects will be referred to as the transferor object and the transferee object respectively. Such a transfer may be implemented at any appropriate time after operation S3 in FIG. 1, and may or may not be associated with a transfer of ownership of any other aspects associated with the object.

In T1 of FIG. 2, the transferor object provides the access-token to the transferee object. In T2, the transferee object generates a new access-token. The new access-token in this example is a randomly generated alpha-numeric string. The transferee object privately stores the new access-token.

In T3, the transferee object provides the resource object with the new access-token. This action may be achieved using a restricted method of the resource object, which the transferee object is able to invoke using the access-token provided to it by the transferor object. The resource object then privately stores the new access-token.

In T4, the original access-token stored by the resource object is invalidated. In some embodiments this may happen automatically as a result of the resource object being provided with a new access-token. In other embodiments, the original access-token may remain valid until invalidated by an explicit instruction made to the resource object by either the transferee or the transferor object. Such invalidation instruction would again be achieved through a restricted method of the resource object, and could be arranged to utilise either the original access-token or the new access-token.

Invalidation of the original access-token prevents the transferor from later accessing the restricted method. In other words, the transferor object ceases in effect to be an authorised object and becomes an unauthorised object, since it no longer knows the valid (new) access-token for the resource object.

The remainder of the processing in FIG. 2 corresponds to the final operations in FIG. 1. Thus in T5, the resource object receives a call to one of its restricted methods from one of the objects in the application. In T6, the resource object determines whether the object making the call, i.e. the caller object, has provided the correct new access-token as an argument to the method call. If the correct new access-token is provided, the flow diagram follows the "YES" branch to T7, where the restricted method executes normally. However, if the new access-token is not provided, the flow diagram follows the "NO" branch to T8, where the restricted method is prevented from executing. A notification that a caller object has been denied access to the restricted method may then be raised in T9.

The following example shows the transfer of FIG. 2 implemented in pseudo-Java code:

```
// the transferor calls:
xNewOwner.setOwned( xOwned, xToken );
// accordingly, the transferee takes over ownership
// xOldToken (the original access-token) is passed as the second parameter
of the call
// the transferee calls:
xNewToken = new Token(...);
XOwnership xOwnership = xOwned.queryInterfaceWithToken(
    XOwnership.Type, xOldToken );
xOwned.setToken( ... /* a new token */, xToken );
```

XOwnership is a restricted interface of the resource object. If it is queried with an invalid access-token, i.e. one which is not associated with the restricted interface, it throws a security exception, such as described above, or returns a null pointer, for example.

In the above code example, the method "setOwned" is any method in which ownership changes, for example, where a window object is created and this window object is set as a container window on another object. When this occurs, ownership changes from the creator of the window to the other object. Note that the ability to transfer ownership and access rights to an object is particularly useful in a factory context, where the "factory" is responsible for creating objects that are then passed for use by various user applications.

It will be appreciated that in some applications, different restricted methods of a resource object may require caller objects to supply different access-tokens. Furthermore, different access-tokens may be used to give caller objects access to different sets of restricted methods. For example, an object which instantiates a resource object having a plurality of restricted methods may be allowed access to all of these restricted methods using a single access-token. The object may additionally generate a second access-token which allows access only to a subset of the restricted methods. The object can then provide other caller objects with this second access-token. This allows the other caller objects to access the subset of restricted methods, but prevents them from accessing the remaining restricted methods. Accordingly, caller objects having in effect different levels of authorisation are provided, with some caller objects being authorised to access all of the restricted methods, and other caller objects being authorised to access some but not all of the restricted methods.

Figure 3:
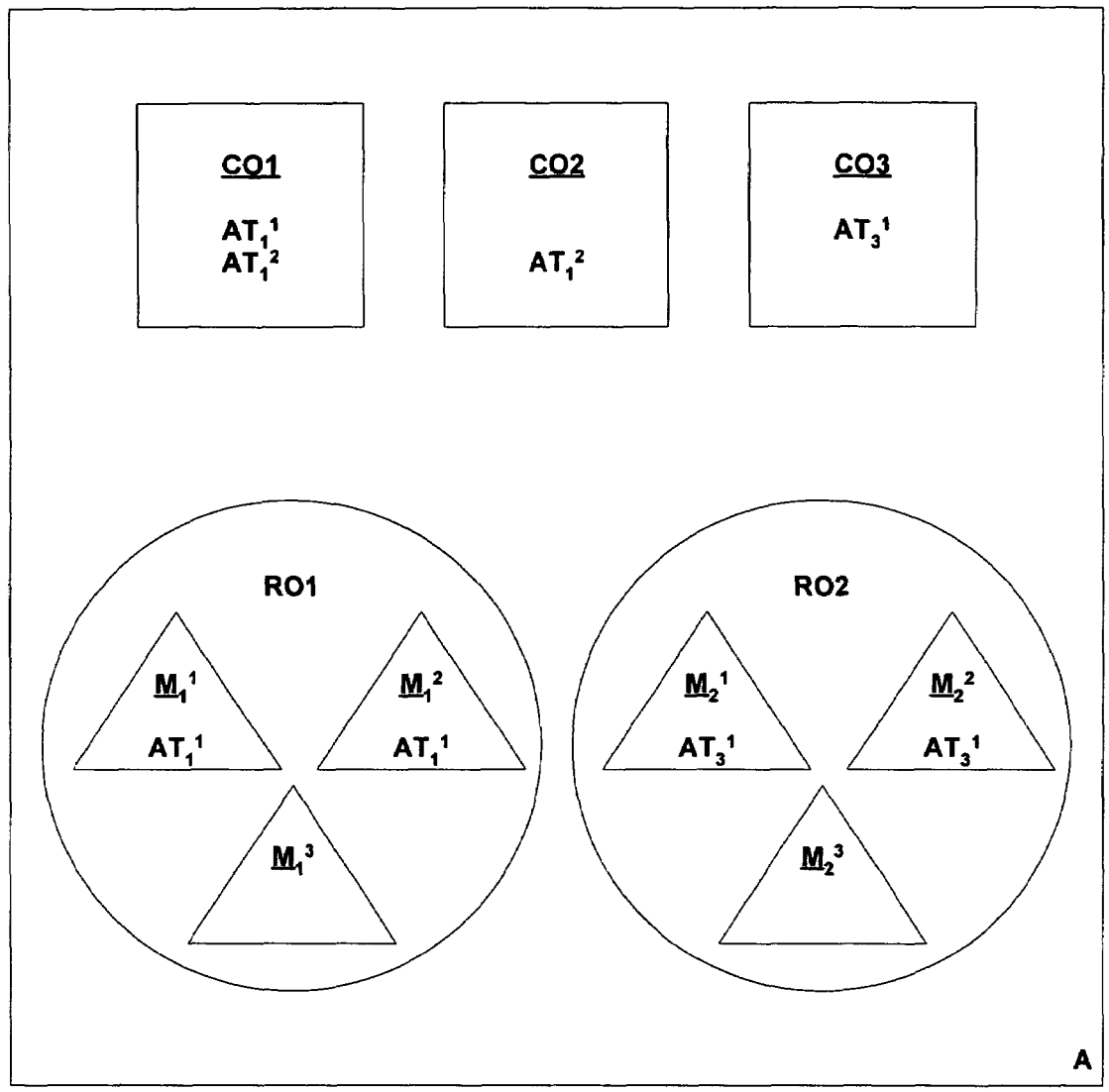
FIG. 3 schematically shows different components of an application running on a computer in accordance with one embodiment of the invention.

FIG. 3 schematically shows different components of an application A running on a computer in accordance with one embodiment of the invention. The application A is shown in one particular state and comprises three caller objects $CO_1$, $CO_2$ and $CO_3$, and two resource objects $RO_1$ and $RO_2$. Each resource object has three methods, $M_1^{1-3}$ and $M_2^{1-3}$ respectively. Both of the resource objects have been created by caller object $CO_1$. (It will again be appreciated that the distinction between caller objects and resource objects is made here for ease of explanation, and that in general, the caller objects $CO_1$, $CO_2$ and $CO_3$ may themselves be resource objects belonging to other objects, perhaps also having restricted methods, and the resource objects $RO_1$ and $RO_2$ may themselves instantiate and call other objects, which again may employ access-tokens to control access to their restricted methods).

For the application A to reach the state shown in FIG. 3, the caller object $CO_1$ initially creates resource object $RO_1$, and generates associated access-token $AT_1^1$. Caller object $CO_1$ privately stores this access-token, as indicated by the symbol "$AT_1^1$" within the box schematically representing caller object $CO_1$ in FIG. 3, as well as passing it to resource object $RO_1$, either at the creation of $RO_1$ or at some later stage. (In the latter case, the resource object may be able to verify the access-token it receives, for example by determining the identify of the caller object, as discussed in more detail below). Methods $M_1^1$ and $M_1^2$ of resource object $RO_1$ are restricted methods and require access-token $AT_1^1$ to access them, as indicated by the symbol "$AT_1^1$" within the triangles schematically representing methods $M_1^1$ and $M_1^2$ in FIG. 3. Method $M_1^3$ of resource object $RO_1$ is unrestricted, and may be accessed by any caller object without requiring an access-token.

Initially, caller object $CO_1$ also creates resource object $RO_2$, having generated associated access-token $AT_1^2$. Caller object $CO_1$ again privately stores this access-token, as well as passing it to resource object $RO_2$. Methods $M_2^1$ and $M_2^2$ of resource object $RO_2$ are restricted methods and require access-token $AT_1^2$ to be provided as part of a call to them if they are to execute. Method $M_2^3$ of resource object $RO_2$ is unrestricted, and may be freely accessed by any caller object.

It is assumed that Caller object $CO_1$ provides caller object $CO_2$ with details of the access-token $AT_1^2$. Caller object $CO_2$ privately stores this access-token, as indicated by the symbol "$AT_1^2$" within the box schematically representing caller object $CO_2$ in FIG. 3. At this point, caller object $CO_1$ may access all methods, caller object $CO_2$ may access the restricted methods $M_2^1$ and $M_2^2$ and the two unrestricted methods $M_1^3$ and $M_2^3$, while caller object $CO_3$ can only access the unrestricted methods $M_1^3$ and $M_2^3$.

Following this, it is assumed that caller object $CO_1$ transfers its rights to call the restricted methods in resource object $RO_2$ to caller object $CO_3$ using the approach shown in FIG. 2. In this process, caller object $CO_3$ generates and privately stores access-token $AT_3$ which is then required to access restricted methods $M_2^1$ and $M_2^2$, while access-token $AT_1^2$ is invalidated in respect of these methods.

Note that as $CO_1$ gives up its rights to access restricted methods $M_2^1$ and $M_2^2$, the ability of $CO_2$ to access these restricted methods is also lost. In other words, although $CO_2$ retains a stored access-token ($AT_1^2$), this access-token becomes no longer valid.

The application is now in the state shown in FIG. 3. In this state, all of the caller objects are able to access the unrestricted methods $M_1^3$ and $M_2^3$. In addition, caller object $CO_1$ is able to access restricted methods $M_1^1$ and $M_1^2$ using access-token $AT_1^1$, while caller object $CO_3$ is able to access the restricted methods $M_2^1$ and $M_2^2$ using access-token $AT_3$.

The above example shows how a comprehensive and fully flexible system of controlling access by different caller objects to different restricted methods of different resource objects can be implemented.

Figure 4:
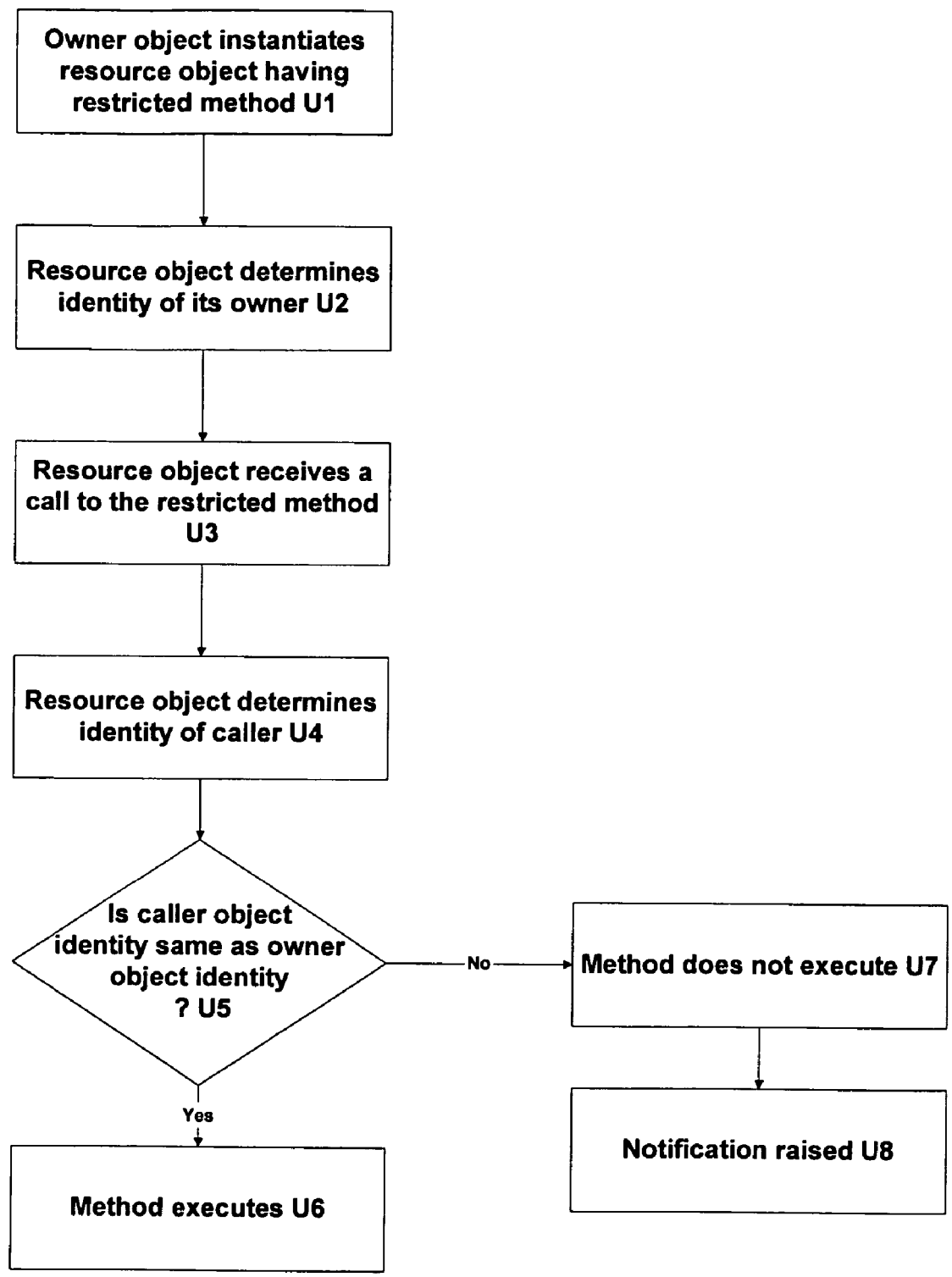
FIG. 4 is a flow diagram schematically showing a scheme for controlling access to a restricted method of an object according to a second embodiment of the invention.

FIG. 4 is a flow diagram schematically showing a scheme for controlling access to a restricted method of a resource object according to another embodiment of the invention. As with the scheme shown in FIG. 1, the scheme of FIG. 4 only allows the owner of the resource object (or other authorised object) to access its restricted methods. The owner object is also the object which instantiates the resource object, i.e. the owner object is also the creator object. The scheme shown in FIG. 4 differs from that of FIG. 1 in that rather than relying on explicit passing of an access-token, instead an access-token implicit to each caller object is used.

In U1 of FIG. 4, the owner object instantiates the resource object which has one or more restricted methods. The resource object may be created conventionally. In U2, the resource object determines and privately stores the identity of its owner, that is to say the identity of the owner object. In this example, the resource object itself is able to determine the identity of its owner, although in other cases, the owner object may explicitly provide the resource object with its identity.

In U3, the resource object receives a call to one of its restricted methods from one of the objects in the application. In U4, the resource object determines the identity of the object making the call, that is to say the identity of the caller object. In U5, the resource object determines whether the identity of the caller object is the same as the identity of the owner object. If the identity of the caller object is the same as the identity of the owner object, the flow diagram follows the "YES" branch to U6, where the restricted method executes normally. If, however, the identity of the caller object is not the same as that of the owner object, the flow diagram follows the "NO" branch to U7, where the method is prevented from executing. In U8 following U7, a notification that a caller object has been denied access to the restricted method is raised.

In the embodiment illustrated in FIG. 4, the resource object controls access by a caller object by using the identity of the caller object as an implicit access-token. The Java virtual machine (VM) is one example of a programming environment in which an object can be configured to determine the identity of an object calling its methods. This approach implies that pre-existing caller objects do not need to be modified to implement the scheme, since they do not need to explicitly include an access token argument in the function call.

It will be appreciated that the above approach can assist in de-bugging, by finding coding errors that are responsible for the occurrence of unauthorised method calls. In addition, the approach can also be used to identify and assess the security risk posed by caller objects maliciously attempting to access restricted methods.

The approach described herein ensures that only the owner of a resource object is able to call its restricted methods, in other words, the object owner is an authorised object. The owner of an object is generally its creator (instantiator), although ownership can be transferred, and sometimes there may be two or more objects sharing ownership of a resource object. Within an application running in a programming environment, objects which are not authorised (usually because they are not the owner of a resource object) may be aware of the existence of the resource object, and may attempt to make calls to its restricted methods. The use of an access-token to protect against such unauthorised calls avoids the risk of the application getting into an unspecified state, and so upsetting the normal running of the application.

The access-token used to control access to the method of the resource object is usually generated by the caller object, although the caller object may acquire it from some other source (e.g. another object or a data file). The access-token may represent some form of random alpha-numeric string, or it may have some other significance, for example, corresponding to an identity indicator or reference of the caller object.

The skilled person will be aware of a wide range of modifications and enhancements of the embodiments of the invention so far described. For example, rather than a resource object receiving an access-token as an argument in a method call, the resource object could search for it on the stack. One advantage of this is where method calls are nested to a considerable depth, and the owner object is at one end of the stack, and the resource object at the other end of the stack. Nevertheless, the resource object is able to review the full contents of the stack (in a Java VM environment) in order to find the access-token to authenticate the method call. It will be appreciated that this obviates having to pass the access token down through all the intermediate objects on the stack between the owner object and the resource object.

Alternatively, a hierarchical arrangement may involve an owner object owning a first resource object which itself owns a second resource object. In this situation, the owner object may be allowed to access restricted methods of the second resource object using the same access-token that it uses to access methods of the first resource object. This may be achieved, for example, by the first resource object providing the second resource object with the access-token when the second resource object is created by the first resource object. In this way, an access-token may be valid throughout a hierarchy of authorised objects.

In embodiments in which a caller object is required to provide an access-token as an argument to a call to a restricted method, the access-token may be a required argument. In this case, any attempt to call the procedure without this argument (whether valid or otherwise) raises a syntax error. In other embodiments, the access-token may be an optional argument. In this latter case, a failure to provide any access-token can be treated in the same way as providing an incorrect access-token (i.e. leading to an authentication failure).

Different access-tokens may be associated with different authorised objects. The resource object is then provided with the set of access-tokens, so that a caller object is an authorised object if it provides any one of the access-tokens for a method call. This allows multiple authorised objects to access the restricted method, each using a different access-token. Consequently, each access-token can be made private to one authorised object, and so need not be shared with any other objects that are authorised to access the restricted method.

As noted above, an object may have multiple restricted methods. These may all share a single access-token, or alternatively different access-tokens may be used to provide access to different restricted methods. For example, a given class of authorised objects may have one level of authorisation which allows them to access certain restricted methods in the object, while another class of authorised objects may have a higher level of authorisation which allows them to access additional restricted methods using a different access-token.

An object may also have a (restricted) method to allow an authorised object to reconfigure the resource object so as to modify access to other restricted methods of the resource object. For example, it may be desired to make one or more previously restricted methods available to all caller objects, irrespective of whether they provide a valid access-token. This allows an authorised object to control whether other caller objects have access to certain ones of the restricted methods in a resource object without having to disclose or share a valid access-token with these other caller objects.

In the embodiments described so far, an access-token is used to control whether or not a caller object is permitted to run a method in the resource object. In addition, the access-token might be used (instead or as well) to control how the method runs. One possibility is that certain arguments or argument values are only available to authorised caller objects (i.e. caller objects supplying the correct access-token). For example, it might be that if a caller object does not supply the correct access-token, a particular variable in the method is set to a default value, rather than to a value passed as an argument into the method. In other words, an access-token may be employed to control not only whether a method can be used, but also how it can be used.

In the embodiments described so far, where an object creates a resource object, the creator object passes the access-token to the resource object. In other embodiments however, the resource object may generate or otherwise acquire the access-token itself, and pass it back to the creator object. The shared access-token can again be used to control access to methods in the resource object as described above. Note that sharing of the access-token from the resource object to the creator object (or vice versa) is conveniently done when the resource object is created (instantiated) or immediately thereafter, but could potentially be performed at some later time (e.g. when the need to restrict access to a method in the resource object becomes apparent).

A further possibility is that the access-token is shared between the caller object and the resource object when the method to the resource object is first called. In other words, the very first call to this method is not authenticated, but rather is used to set up the authentication procedure. Thus as part of (or in response to) this call, the access-token is shared between the caller object and the resource object. For example, the caller object may provide the access-token to the resource object as part of the call, or the resource object may return the access-token back to the caller object, e.g. as a return parameter. With the access-token thereby shared between the caller object and the resource object, all subsequent calls to the method can be authenticated in the manner described above.

The approach described herein may be applied to an application running on a single computer, or to an application running on a network of computers. For example, in an application, a caller object, which may be an authorised or an unauthorised object, may reside on one computer in a network while the resource object having the restricted method may reside on another.

Details of the access-token may be encrypted before being transferred between the different computers. This can be done both when initially providing the resource object with details of the access-token, and when making subsequent calls to the restricted method which are accompanied by an access-token. Encryption can help to improve security by providing a degree of protection against the access-token being hijacked. Such cryptography could be based on a symmetric encryption algorithm, in which the caller and called object both utilise the same key, or on asymmetric (public key) encryption.

In one embodiment, public key cryptography may be utilised to provide the access token itself. For example, at creation the owner object may supply the resource object with a public key corresponding to a private key held by the owner object. The owner object would then use the private key to encrypt a method call into the resource object, which the resource object would then decrypt with the stored public key. The decryption would only be successful if the key used by the resource object matched the key used by the caller object. A symmetric encryption algorithm could also be used for this approach.

The above described schemes provide particularly strong defence when employed in programming environments that do not allow for direct memory access, such as the Java programming language. This is because in these environments it is not possible for access-tokens to be illegitimately lifted from objects stored in memory. Nevertheless, the approach described herein is applicable to a very wide range of object-based programming environments, such as the Common Object Request Broker Architecture (COBRA), the Distributed Component Object Model (DCOM) and the .NET environments, for example. Note that intrinsic support for the authentication scheme described above could also be provided in a programming language. In other words, the language would ensure that a method in a resource object could only be called by an owner object, or by an object that has some suitable association with the owner object.

One embodiment of the invention described herein is provided as a computer program product, which may comprise program instructions stored on a removable storage medium, for example an optical (CD ROM, DVD, etc), semiconductor (e.g. flash memory) or magnetic (floppy disk, tape, etc) device. Such a medium can then be introduced into a computer system, such as a server, a client, a smart card, etc., in order to transfer the program instructions to the system. Alternatively, the program instructions may be transferred to the computer system by some suitable wired and/or wireless communications link, such as a bus, a download via a transmission signal medium over a network, for example, a local area network (LAN), the Internet, and so on. The transferred program instructions are often stored on a hard disk or other non-volatile storage of a computer system, and loaded for use into random access memory (RAM) for execution by a system processor.

In conclusion, although a variety of particular embodiments have been described in detail herein, it will be appreciated that this is by way of exemplification only. Accordingly, the skilled person will be aware of many further potential modifications and adaptations that fall within the scope of the claimed invention and its equivalents. In addition, although particular aspects of the invention are set out in the accompanying independent and dependent claims, combinations of features from the dependent claims may be combined with features of the independent claims as appropriate and not merely as explicitly set out in the claims.

The invention claimed is:

1. A method, comprising:
performing by one or more processors:
a first object creating a second object in an object-oriented computing environment, wherein the second object comprises a restricted method;
the second object providing an access-token to the first object to share the access-token with the first object, wherein the second object retains the access-token, and wherein the access-token is useable to control access to the restricted method by particular object instances subsequent to said providing;
the second object receiving a method call to the restricted method accompanied by a caller access-token;
the second object authenticating the caller access-token against the shared access-token; and
executing the restricted method if the caller access-token is valid; or
denying the access to the restricted method if the caller access-token is not valid.

2. The method according to claim 1, further comprising providing the access-token to the first object in response to the first object making a call to said restricted method.

3. The method according to claim 1, further comprising the second object generating the access-token prior to said providing the access-token to the first object.

4. The method according to claim 1, wherein said access-token comprises an identity indicator of the first object.

5. The method according to claim 4, further comprising a runtime environment automatically providing said identity indicator of the first object to the second object at creation of the second object.

6. The method according to claim 1, wherein the second object receives the caller access-token as an argument of the method call.

7. The method according to claim 6, wherein the second object receives the caller access-token in encrypted form.

8. The method according to claim 1, wherein the caller access-token is passed implicitly as part of a runtime environment to accompany said method call.

9. The method according to claim 1, further comprising:
the first object providing a third object with the access-token;
the third object making a method call to the restricted method accompanied by the access-token provided by the first object; and
the third object being allowed access to the restricted method.

10. The method according to claim 1, further comprising:
sharing a second access-token between the first object and the second object, the second object retaining said second access-token; and
the second object authenticating a caller access-token against said second access-token.

11. The method according to claim 10, further comprising invalidating the access-token originally shared with the first object.

12. The method according to claim 10, wherein said sharing a second access-token comprises the first object providing the second access-token to the second object in conjunction with a caller access-token, further comprising the second object authenticating the caller access-token provided in conjunction with the second access-token against the originally shared access-token prior to accepting the second access-token for use in authentication.

13. The method according to claim 10, wherein said sharing a second access-token comprises the second object providing the second access-token to the first object in response to the first object providing the second object with a caller access-token, further comprising the second object authenticating the caller access-token provided by the first object against the originally shared access-token prior to providing the second access-token to the first object.

14. The method according to claim 1, further comprising raising a notification if the caller access-token does not match the shared access-token.

15. The method according to claim 14, wherein the notification is a security exception.

16. The method according to claim 1, wherein the first object is the owner of the second object.

17. The method according to claim 1, wherein the object-oriented computing environment is a protected runtime environment.

18. A system, comprising:
a processor; and
a memory coupled to the processor;
wherein the memory comprises program instructions executable by the processor to implement:
a first object creating a second object in an object-oriented computing environment, wherein the second object comprises a restricted method;
the second object providing an access-token to the first object to share the access-token with the first object, wherein the second object retains the access-token, and wherein the access-token is useable to control access to the restricted method by particular object instances subsequent to said providing;

the second object receiving a method call to the restricted method accompanied by a caller access-token;

the second object authenticating the caller access-token against the shared access-token to control use of the method; and executing the restricted method if the caller access-token is valid; or denying the access to the restricted method if the caller access-token is not valid.

19. The system of claim 18, wherein the program instructions are further executable to implement said providing the access-token to the first object in response to the first object making a call to said restricted method.

20. The system of claim 18, wherein the program instructions are further executable to implement the second object generating the access-token prior to said providing the access-token to the first object.

21. The system of claim 18, wherein said access-token comprises an identity indicator of the first object.

22. The system of claim 21, wherein the program instructions are further executable to implement a runtime environment automatically providing said identity indicator of the first object to the second object at creation of the second object.

23. The system of claim 18, wherein the second object receives the caller access-token as an argument of the method call.

24. The system of claim 23, wherein the second object receives the caller access-token in encrypted form.

25. The system of claim 18, wherein the caller access-token is passed implicitly as part of a runtime environment to accompany said method call.

26. The system of claim 18, wherein the program instructions are further executable to implement:

the first object providing a third object with the access-token;

the third object making a method call to the restricted method accompanied by the access-token provided by the first object; and the third object being allowed access to the restricted method.

27. The system of claim 26, wherein the program instructions are further executable to implement:

sharing a second access-token between the first object and the second object;

the second object retaining said second access-token; and the second object authenticating a caller access-token against said second access-token.

28. The system of claim 27, wherein the program instructions are further executable to implement invalidating the access-token originally shared with the first object.

29. The system of claim 27, wherein said sharing a second access-token comprises the first object providing the second access-token to the second object in conjunction with a caller access-token, and wherein the program instructions are further executable to implement the second object authenticating the caller access-token provided in conjunction with the second access-token against the originally shared access-token prior to accepting the second access-token for use in authentication.

30. The system of claim 27, wherein said sharing a second access-token comprises the second object providing the second access-token to the first object in response to the first object providing the second object with a caller access-token, wherein the program instructions are further executable to implement the second object authenticating the caller access-token provided by the first object against the originally shared access-token prior to providing the second access-token to the first object.

31. The system of claim 18, wherein the program instructions are further executable to implement raising a notification if the caller access-token does not match the shared access-token.

32. A method, comprising:

performing by one or more processors:

a first object creating a second object in an object-oriented computing environment;

the second object providing an access-token to the first object to share the access-token with the first object;

the second object retaining the access-token;

the first object making a call to a restricted method of the second object, wherein said call is accompanied by the access-token;

the second object authenticating the access-token accompanying the call against the shared access-token, wherein the shared access-token is useable to control access to the restricted method by particular object instances subsequent to said providing; and executing the restricted method if the access-token accompanying the call is valid; or denying the access to the restricted method if the access-token accompanying the call is not valid.

33. A method, comprising:

performing by one or more processors:

an object comprising a restricted method providing an access-token to a second object that created the object to share the access-token with the second object in an object-oriented computing environment;

the object storing the shared access-token;

the object receiving a method call to the restricted method accompanied by an access-token;

the object authenticating the access-token accompanying the method call against the access-token shared with the second object, wherein the shared access-token is useable to control access to the restricted method by particular object instances subsequent to said providing; and executing the restricted method if the access-token accompanying the call is valid; or denying the access to the restricted method if the access-token accompanying the call is not valid.

34. A method for controlling the use of a method in an object-oriented computing environment, comprising:

performing by one or more processors:

receiving a call from a first object to a method of a second object in the object-oriented computing environment, said call representing a first call to said method;

the second object providing an access-token to the first object to share the access-token with the first object in response to said first call, wherein the second object retains the access-token, and wherein the access-token is useable to control access to the method of the second object by particular object instances subsequent to said providing;

the second object receiving a subsequent call to said method of the second object accompanied by a caller access-token;

the second object being capable of controlling the use of the method of the second object by authenticating the caller access-token against the shared access-token; and executing the restricted method if the caller access-token is valid; or denying the access to the restricted method if the caller access-token is not valid.

35. A method for controlling the use of a method in an object-oriented computing environment, comprising:

performing by one or more processors:

a second object providing an access-token to a first object to share the access-token with the first object in the object-oriented computing environment;

retaining the access-token in the second object;

receiving a call to a method of the second object, said call being accompanied by a caller access-token;

the second object authenticating the caller access-token against the shared access-token, wherein the access-token is useable to control access to the method of the second object by particular object instances subsequent to said providing; and executing the method of the second object if the caller access-token is valid; or denying the access to the restricted method if the caller access-token is not valid.

36. A computer-readable storage medium comprising program instructions, said program instructions being computer-executable to implement:

a first object creating a second object in an object-oriented computing environment, wherein the second object comprises a restricted method;

the second object providing an access-token to the first object to share the access-token with the first object, wherein the second object retains the access-token, and wherein the access-token is useable to control access to the restricted method by particular object instances subsequent to said providing; and the second object receiving a method call to the restricted method accompanied by a caller access-token;

wherein the second object is capable of controlling use of the method by authenticating the caller access-token against the shared access-token; and executing the restricted method if the caller access-token is valid; or denying the access to the restricted method if the caller access-token is not valid.

37. A computer-readable storage medium comprising program instructions, said program instructions being computer-executable to implement:

receiving a call from a first object to a method of a second object in an object-oriented computing environment, said call representing the first call to said method;

the second object providing an access-token to the first object to share the access-token with the first object in response to said first call, wherein the second object retains the access-token, and wherein the access-token is useable to control access to said method by particular object instances subsequent to said providing;

the second object receiving a subsequent call to said method accompanied by a caller access-token;

the second object authenticating the caller access-token against the shared access-token; and executing the method if the caller access-token is valid; or denying the access to the restricted method if the caller access-token is not valid.

38. A computer-readable storage medium comprising program instructions, said program instructions being computer-executable to implement:

a second object providing an access-token to a first object to share the access-token with the first object in an object-oriented computing environment;

retaining the access-token in the second object; and receiving a call to a method of the second object, said call being accompanied by a caller access-token;

the second object authenticating the caller access-token against the shared access-token, wherein the access-token is useable to control access to said method by particular object instances subsequent to said providing; and executing the method if the caller access-token is valid; or denying the access to the restricted method if the caller access-token is not valid.

* * * * *

UNITED STATES PATENT AND TRADEMARK OFFICE
CERTIFICATE OF CORRECTION

PATENT NO. : 7,668,862 B2  Page 1 of 1
APPLICATION NO. : 11/049517
DATED : February 23, 2010
INVENTOR(S) : Michael Hoennig It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Seventh Day of December, 2010

David J. Kappos
*Director of the United States Patent and Trademark Office*